(12) United States Patent
Paczkowski et al.

(10) Patent No.: US 9,183,606 B1
(45) Date of Patent: Nov. 10, 2015

(54) TRUSTED PROCESSING LOCATION WITHIN A GRAPHICS PROCESSING UNIT

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 182 days.

(21) Appl. No.: 13/939,175

(22) Filed: Jul. 10, 2013

(51) Int. Cl.
  *G06T 1/00* (2006.01)
  *G06T 15/00* (2011.01)
  *G06F 15/00* (2006.01)

(52) U.S. Cl.
  CPC ........................................ *G06T 1/00* (2013.01)

(58) Field of Classification Search
  None
  See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 6,131,024 A | 10/2000 | Boltz | |
| 6,177,860 B1 | 1/2001 | Cromer et al. | |
| 6,219,712 B1 | 4/2001 | Mann et al. | |
| 6,363,150 B1 | 3/2002 | Bhagavath et al. | |
| 6,477,180 B1 | 11/2002 | Aggarwal et al. | |
| 6,507,904 B1 | 1/2003 | Ellison et al. | |
| 6,614,893 B1 | 9/2003 | Paiz | |
| 6,668,322 B1 | 12/2003 | Wood et al. | |
| 6,691,230 B1 | 2/2004 | Bardon | |
| 6,754,784 B1 | 6/2004 | North et al. | |
| 6,823,454 B1 | 11/2004 | Hind et al. | |
| 6,824,064 B2 | 11/2004 | Guthery et al. | |
| 6,895,234 B1 | 5/2005 | Laursen et al. | |
| 7,043,241 B1 | 5/2006 | Sladek et al. | |
| 7,366,806 B2 | 4/2008 | Milenkovic et al. | |
| 7,387,240 B2 | 6/2008 | Ziegler | |
| 7,519,824 B1 | 4/2009 | Peyravian et al. | |
| 7,552,467 B2 | 6/2009 | Lindsay | |
| 7,571,364 B2 | 8/2009 | Whetsel | |

(Continued)

FOREIGN PATENT DOCUMENTS

WO WO2011025433 A1 3/2011
WO WO1264171 A1 5/2012

(Continued)

OTHER PUBLICATIONS

Foreign Communication from a Related Counterpart—International Search Report and Written Opinion, dated Jul. 11, 2014, PCT/US14/16651, filed on Feb. 16, 2014.

(Continued)

*Primary Examiner* — Jacinta M Crawford

(57) ABSTRACT

A method of extending trust from a trusted processor to a graphics processing unit to expand trusted processing in an electronic device comprises inserting a trusted kernel into the graphics processing unit, monitoring the activity level of the graphics processing unit, suspending graphics processing on at least a portion of the graphics processing unit, repurposing a portion of the graphics processing unit to perform trusted processing, and releasing the portion of the graphics processing unit from trusted processing.

19 Claims, 10 Drawing Sheets

(56) References Cited

U.S. PATENT DOCUMENTS

| | | |
|---|---|---|
| 7,650,645 B1 | 1/2010 | Langendorf et al. |
| 7,716,720 B1 | 5/2010 | Marek et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 * | 5/2014 | Paleja et al. .......... 713/187 |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 2001/0041591 A1 | 11/2001 | Carroll |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0129488 A1 | 6/2006 | Vincent |
| 2006/0156026 A1 | 7/2006 | Utin |
| 2006/0164978 A1 | 7/2006 | Werner et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0118880 A1 | 5/2007 | Mauro, II |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0005794 A1 | 1/2008 | Inoue et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2009/0047923 A1 | 2/2009 | Jain et al. |

(56) References Cited

U.S. PATENT DOCUMENTS

| | | |
|---|---|---|
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0050713 A1* | 3/2011 | McCrary et al. .............. 345/522 |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |

(56) References Cited

U.S. PATENT DOCUMENTS

| | | |
|---|---|---|
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0262264 A1 | 10/2013 | Karstoft |
| 2013/0263212 A1 | 10/2013 | Faltyn et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani Rita et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0047548 A1 | 2/2014 | Bye et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1* | 3/2014 | O'Connor et al. ............ 713/322 |
| 2014/0104287 A1* | 4/2014 | Nalluri et al. ............... 345/522 |
| 2014/0106709 A1 | 4/2014 | Palamara et al. |
| 2014/0141718 A1 | 5/2014 | Stromberg et al. |
| 2014/0155025 A1 | 6/2014 | Parker et al. |
| 2014/0173747 A1 | 6/2014 | Govindaraju |
| 2014/0188738 A1 | 7/2014 | Huxham |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1* | 9/2014 | Chhabra et al. ............... 345/531 |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |

FOREIGN PATENT DOCUMENTS

| | | |
|---|---|---|
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Cope, Warren B., et al., "Electronic Purchase Transaction Trust Infrastructure", filed May 29, 2012, U.S. Appl. No. 13/482,731.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Trusted Security Zone Containers for the Protection and Confidentiality of Trusted Service Manager Data", filed Feb. 16, 2014, PCT Application No. PCT/US14/16651.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.

(56) References Cited

OTHER PUBLICATIONS

Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Search Report and Written Opinion, dated Apr. 22, 2014, PCT/US13/53617, filed on Aug. 5, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.

(56) References Cited

OTHER PUBLICATIONS

First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.

Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Notice of Allowance dated May 29, 2015, U.S. Appl. No. 14/085,474, filed Nov. 20, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed on Aug. 10, 2012.
Notice of Allowance dated Jun. 9, 2015, U.S. Appl. No. 13/762,319, filed on Feb. 7, 2013.
Notice of Allowance dated Aug. 4, 2015, U.S. Appl. No. 14/090,667, filed Nov. 26, 2013.3.
Notice of Allowance dated Jul. 6, 2015, U.S. Appl. No. 13/844,145, filed on Mar. 15, 2013.
Notice of Allowance dated Jul. 6, 2015, U.S. Appl. No. 14/066,661, filed on Oct. 29, 2013.
Notice of Allowance dated Aug. 14, 2015, U.S. Appl. No. 13/594,779, filed on Aug. 25, 2012.
Final Office Action dated Aug. 27, 2015, U.S. Appl. No. 13/802,404, filed on Mar. 13, 2013.
Advisory Action dated Jun. 10, 2015, U.S. Appl. No. 13/844,282, filed on Mar. 15, 2013.
Office Action dated Aug. 24, 2015, U.S. Appl. No. 13/844,282, filed on Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed on Nov. 8, 2013.
Notice of Allowance dated Jul. 22, 2015, U.S. Appl. No. 14/229,532, filed Mar. 28, 2014.
Notice of Allowance dated Aug., 28, 2015, U.S. Appl. No. 14/446,330, filed Jul. 29, 2014.
FAIPP Pre-Interview Communication dated Aug. 5, 2015, U.S. Appl. No. 13/857,141, filed on Apr. 4, 2013.
FAIPP Pre-Interview Communication dated Jun. 2, 2015, U.S. Appl. No. 13/857,139 filed on Apr. 4, 2013.
Notice of Allowance dated Jun. 11, 2015, U.S. Appl. No. 13/857,138, filed on Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uldresearch/pubs/ieeeic01.pdf.

* cited by examiner

TRUSTED PROCESSING LOCATION WITHIN A GRAPHICS PROCESSING UNIT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An electronic device that presents graphical images on a display may comprise a graphics processing unit (GPU). A graphics processing unit is a specialized electronic circuit designed to rapidly manipulate and alter memory to accelerate building of images intended for output on a display. A graphics processing unit can complete graphics processing tasks more quickly and more efficiently than a central processing unit (CPU) can due to its possession of a highly parallel structure which allows large blocks of data to be processed in parallel. An electronic device comprising a graphics processing unit is likely to delegate graphics processing to the graphics processing unit rather than to a CPU in order to take advantage of the parallel processing advantage provided by the structure of the graphics processing unit.

SUMMARY

In an embodiment, a method of extending trust from a trusted processor to a graphics processing unit to expand trusted processing in an electronic device is disclosed. The method comprises inserting a trusted kernel into the graphics processing unit, monitoring the activity level of the graphics processing unit, suspending graphics processing on at least a portion of the graphics processing unit, repurposing a portion of the graphics processing unit to perform trusted processing, and releasing the portion of the graphics processing unit from trusted processing.

In an embodiment, a method of increasing the processing capacity of an electronic device is disclosed. The method comprises providing, in a trusted security zone of the electronic device, a trusted kernel that, when inserted into a graphics processing unit, determines the activity level of the graphics processing unit, repurposes a portion of the graphics processing unit from a graphics processing state to a non-graphics processing state in response to determining that the graphics processing unit has processing resources available, and returns the portion of the graphics processing unit to the graphics processing state in response to a trigger. The method further comprises inserting the trusted kernel into the graphics processing unit.

In an embodiment, a method of evaluating a graphics processing unit in an electronic device is disclosed. The method comprises performing a confidence check on at least one kernel of the graphics processing unit, comparing a current state of the graphics processing unit with an uncompromised state of the graphics processing unit stored in a trusted security zone of the electronic device, evaluating the integrity of the graphics processing unit based on the comparing, and performing an action in response to a result of the evaluating.

In an embodiment, a method of increasing the trusted processing capacity of an electronic device is disclosed. The method comprises providing, in a trusted security zone of the electronic device, a trusted kernel, inserting the trusted kernel into a graphics processing unit, determining the activity level of the graphics processing unit, repurposing a portion of the graphics processing unit from a graphics processing state to a trusted processing state in response to determining that the graphics processing unit has processing resources available, and returning the portion of the graphics processing unit to the graphics processing state in response to a trigger These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
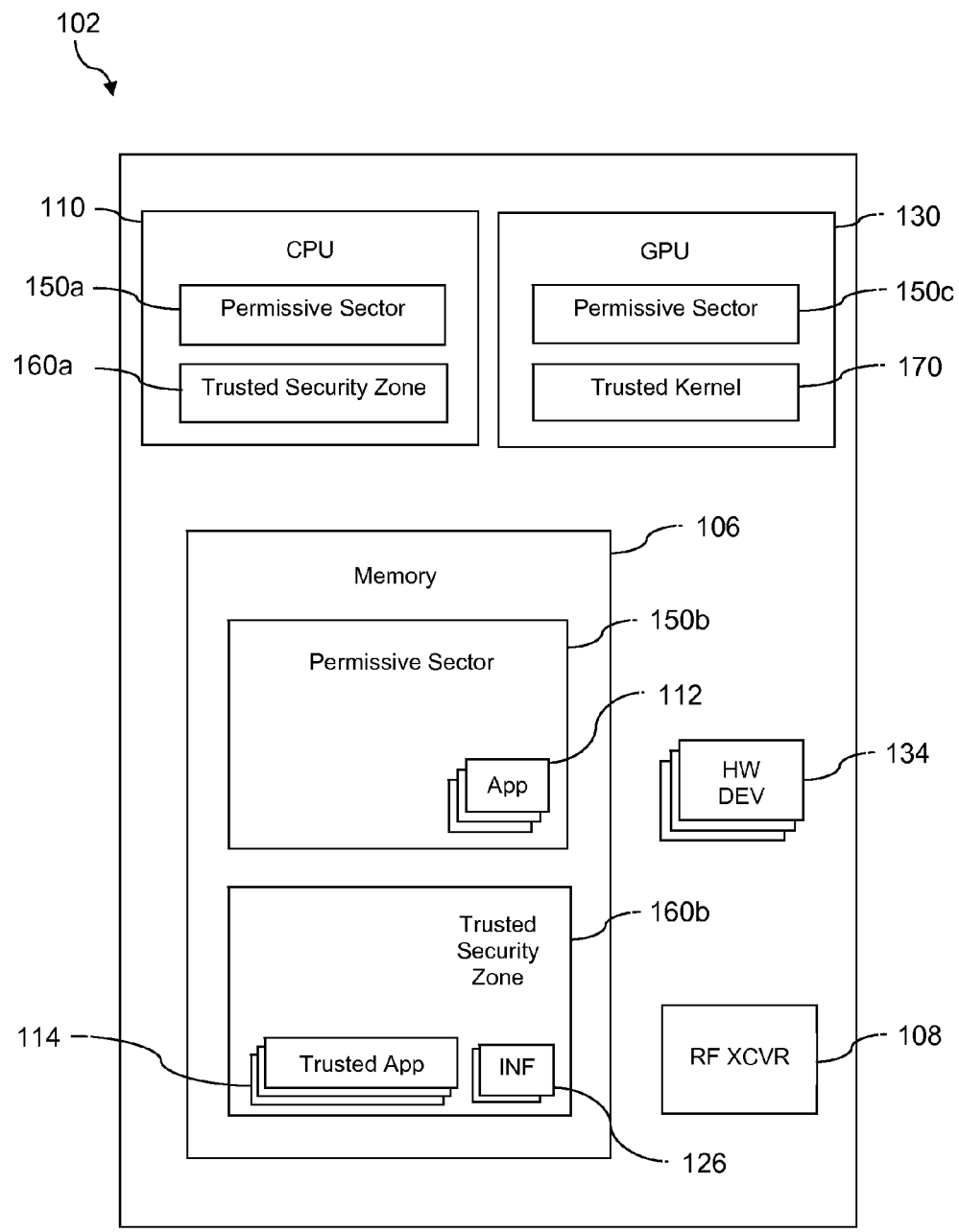
FIG. 1 is an illustration of an electronic device according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An electronic device such as a mobile phone, a personal digital assistant, a media player, another mobile device, a desktop computer, a laptop computer, a notebook computer, another computer, a gaming system, television set, or another electronic device may present images on a display. The images may be static, dynamic, three dimensional (3-D), or the images may be combinations thereof. For example, the images may be dynamic and three dimensional as seen in some video games. Alternatively, the images may be static and three dimensional as in some photographs. The electronic device may implement a graphics processing unit (GPU) in order to meet graphics processing demands associated with presenting images on the display. The highly parallel structure of the graphics processing unit allows for rapid manipulation and alteration of memory which accelerates the building of images. This structure may give the graphics processing unit the ability to meet the graphics processing demands of the electronic device.

The present disclosure teaches a method of increasing the trusted processing capacity of an electronic device. It may be that the graphics processing unit has available processing resources that are not in use in the absence of intense graphics processing. For example, the graphics processing unit may have processing resources that are not in use when the display presents a static image. In an embodiment, the electronic device may repurpose a portion of the graphics processing unit to perform trusted processing tasks, tasks that do not involve graphics processing activities, in the absence of intense graphics processing demands in order to make use of the processing resources that may be available on the graphics processing unit. Alternatively, the electronic device may repurpose the portion of the graphics processing unit to perform non-graphics processing tasks outside the realm of trust.

The electronic device comprises a trusted security zone. As described further below, trusted security zones reduce the ability of nefarious applications and/or programs that may have infiltrated the electronic device to read from or write to memory, to read from or write to input/output devices, or to read from or write to communication ports while the subject processor and/or electronic device is executing in the trusted security zone. An application executing in the trusted security zone can have a high level of confidence that an untrusted application is not executing on the electronic device at the same time and hence is prevented from interfering with or monitoring the activities of the application.

The method comprises providing, in the trusted security zone of the electronic device, a trusted kernel. After being inserted into the graphics processing unit, the trusted kernel may determine the activity level of the graphics processing unit and repurpose a portion of the graphics processing unit from a graphics processing state to a trusted processing state in response to determining that the graphics processing unit has processing resources available. Converting the graphics processing unit from the graphics processing state to the trusted processing state may allow for delegation of selected trusted processing tasks between the graphics processing unit and the CPU.

Allocating some of the CPU's trusted processing tasks to the graphics processing unit when the graphics processing unit has processing resources available may free up CPU processing resources and may improve the speed and efficiency of the electronic device. Similarly, the graphics processing unit may be used to execute a process and may delegate processing tasks to the CPU. Such a system may be used to take advantage of the greater processing speed of the graphics processing unit for certain tasks, for example tasks that do not involve graphics processing activities. The graphics processing unit may be returned to the graphics processing state when a demand for graphics processing is received. In some cases, the repurposed portion of the graphics processing unit may be repurposed for processing outside of the trusted security zone.

In an embodiment, the trustworthiness of the graphics processing unit may be evaluated by performing a confidence check on at least one kernel of the graphics processing unit. The confidence check may comprise comparing a current state of the graphics processing unit with an uncompromised state of the graphics processing unit stored in a trusted security zone of the electronic device. The integrity of the graphics processing unit may be evaluated based on a result of the comparison. If the graphics processing unit is determined to be uncompromised and/or trustworthy, then the electronic device may allow the graphics processing unit to function normally; however, if the graphics processing unit is determined to be compromised and/or untrustworthy, the electronic device may take action to return the graphics processing unit to the uncompromised state and/or prevent the compromised graphics processing unit from functioning.

In an embodiment, a trusted CPU of the electronic device may extend trust to the graphics processing unit. A trusted kernel may be inserted into the graphics processing unit, and the graphics processing unit may be prevented from running non-trusted applications absent trusted instructions. The trusted kernel may direct the graphics processing unit to perform trusted processing tasks when it detects that the graphics processing unit has available processing resources.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532, 588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone. It is anticipated that performing the confidence check on the graphics processing unit may allow the electronic device to detect nefarious programs that it may have been otherwise unable to detect which may provide greater security to the electronic device. Extending trust from the trusted CPU to the graphics processing unit is expected to further fortify the trusted security zone against nefarious programs and to increase the trusted processing resources of the electronic device.

Turning now to FIG. 1, an electronic device 102 is described. In an embodiment, the electronic device 102 comprises a central processing unit (CPU) 110, a graphics processing unit (GPU) 130, a memory 106, a plurality of hardware devices 134, a radio frequency transceiver (RF XCVR) 108, a permissive sector 150, and a trusted security zone 160. For clarity, the permissive sector 150 and the trusted security zone 160 have been subdivided according to component in FIG. 1. It should be understood that each subdivision of the trusted security zone 160 may be substantially similar to other subdivisions of the trusted security zone 160 and/or the trusted security zone 160 as a whole. Alternatively, each subdivision of the trusted security zone 160 may be different from other subdivisions of the trusted security zone 160 and properties of the trusted security zone 160 as a whole may result from relationships between subdivisions. It is contemplated that, in some cases, each subdivision of the trusted security zone 160 may function independently. It should likewise be understood that each subdivision of the permissive sector 150 may be substantially similar to other subdivisions of the permissive sector 150 and/or the permissive sector 150 as a whole. Alternatively, each subdivision of the permissive sector 150 may be different from other subdivisions of the permissive sector 150.

The memory 106 may be partitioned into the permissive sector 150b and the trusted security zone 160b. The permissive sector 150b may comprise a plurality of non-trusted applications 112 and/or other non-trusted information. In an embodiment, the plurality of hardware devices 134 may comprise a display, a screen, a graphical user interface, a monitor, and/or other devices on which images built by the graphics processing unit 130 may be presented. The trusted security zone 160b may comprise a plurality of trusted applications 114, trusted information (INF) 126, and/or other items stored in trust.

As discussed hereinabove with reference to trusted security zones, the hardware and software components of the electronic device 102 may be partitioned into permissive sectors and trusted security zones. For example, the CPU 110 may be divided into the permissive sector 150a and the trusted security zone 160a as shown in FIG. 1. Although shown in FIG. 1 as comprising the permissive sector 150c and a trusted kernel 170, it is contemplated that the graphics processing unit 130 may be divided into the permissive sector 150c and a subdivision of the trusted security zone 160. When trusted processes are activated, all activity in the permissive sector 150 ceases until the trusted processes are terminated in order to limit nefarious programs from breaching the trusted security zone 160.

In an embodiment, the CPU 110 may comprise multiple cores. For example, the CPU 110 may comprise two cores, four cores, or some other number of cores, wherein the permissive sector 150a and the trusted security zone 160a may reside in separate cores. FIG. 1 shows a single CPU 110 and a single graphics processing unit 130, but it should be understood that the electronic device 102 may comprise multiple CPU's 110 and/or multiple graphics processing units 130 which may comprise a substantially similar separation of the permissive sector 150 and the trusted security zone 160. Alternatively, when the electronic device 102 comprises multiple CPU's 110 and/or multiple graphics processing units 130, each may be designated as being either wholly in the permissive sector 150 or wholly in the trusted security zone 160. Similar to depiction of the permissive sector 150a and the trusted security zone 160a in the CPU 110, the permissive sector 150b and the trusted security zone 160b are depicted as sharing the memory 106 in FIG. 1. The permissive sector 150b and the trusted security zone 160b may occur as separate partitions of a single memory chip, or they may occur in physically separate chips.

Graphics processing units, such as the graphics processing unit 130, are specialized electronic circuits designed to perform complex mathematical and geometrical calculations for graphics rendering. The parallel structure of graphics processing units resulting from a plurality of processing cores optimizes the graphics processing capability of graphics processing units. A graphics processing unit, such as the graphics processing unit 130, is able to transfer to and from memory much faster than a CPU, such as the CPU 110, which allows the graphics processing unit to produce a wash of images on a display that the CPU may be unable to produce. For example, the graphics processing unit 130 may be able to satisfy a demand for a rapid wash of images as a movie is played on the electronic device 102 while the CPU 110 may be unable to produce images quickly enough to meet the demand. Thus, it is typical for graphics processing to be assigned to graphics processing units. Gaming consoles, desktop computers, laptop computers, television sets, cell phones, smart phones, mobile phones, multimedia players, graphics engines, mobile devices, and other electronic devices that may experience a demand for graphics processing may comprise a graphics processing unit, such as the graphics processing unit 130, to which graphics processing tasks are assigned.

In the absence of intense graphics processing, the graphics processing unit 130 may have processing resources that are not in use. Intense graphics processing may comprise producing images associated with video game play, producing images associated with a movie or television program, producing dynamic images, producing three dimensional (3-D) images, producing a rapid wash of images to be displayed on a display, or producing other images to be displayed on a display. Intense graphics processing may comprise a level of graphics processing in which about 10%, about 20%, about 30%, about 40%, about 50%, about 60%, about 70%, about 80%, about 90%, or about 100% of the graphics processing unit 130 is being used for processing graphics. It is contemplated that the graphics processing unit 130 may have processing resources that are not in use even at times of intense graphics processing. It should be understood that approximate percentages discussed herein are intended to include the exact percentage used to describe the approximate value. For example, about 50% is intended to include exactly 50% and about 100% is intended to include exactly 100%.

In an embodiment, the percentage of the graphics processing unit 130 used for graphics processing may be the percentage of the graphics processing unit's 130 processing resources used for graphics processing. For example, if 50% of the graphics processing unit's 130 processing resources are being used for processing graphics, then it may be said that 50% of the graphics processing unit 130 is being used for processing graphics. Alternatively, the percentage of the graphics processing unit 130 used for processing graphics may be the percentage of the graphics processing unit 130 as a whole that is used for processing graphics. One skilled in the art would appreciate that unlike a CPU, such as the CPU 110, a graphics processing unit, such as the graphics processing unit 130, may be unable to perform tasks other than graphics processing despite having unused processing resources available without first being repurposed for those tasks.

The graphics processing unit 130 may be configured to execute only graphics processing programs and/or instructions unless instructed otherwise by a trusted source. In an embodiment, the graphics processing unit 130 may be configured to perform graphics processing functions and to respond to instructions from trusted sources. Accordingly, the graphics processing unit 130 may be configured to resist executing non-trusted items unrelated to graphics processing absent trusted instructions. For example, the graphics processing unit 130 may not execute an application from the permissive sector 150 unless instructed to do so by the trusted security zone 160, the trusted kernel 170, or unless instructed to do so by another trusted source. Limiting the graphics processing unit 130 to graphics processing unless instructed otherwise by a trusted source may make it more difficult for nefarious programs to gain access to the graphics processing unit 130.

In an embodiment, the trusted kernel 170 may be inserted into the graphics processing unit 130. The trusted kernel 170 may be inserted at the time of manufacture, or the trusted kernel 170 may be inserted at some other time. Prior to insertion of the trusted kernel 170, the electronic device 102 may save its present state to the memory 106. In some cases, the trusted kernel 170 may take over as the base operating system for the graphics processing unit 130. The trusted kernel 170 may be configured to repurpose a portion of the graphics processing unit 130 such that the repurposed portion is able to perform non-graphics related processing tasks, general processing tasks, trusted processing tasks, or other processing tasks. Non-graphics related processing tasks may comprise executing applications from the permissive sector 150, executing applications from the trusted security zone 160, general processing tasks, trusted processing tasks, and/or performing other tasks. In some contexts, general processing tasks may be substantially similar to non-graphics related processing tasks. Trusted processing tasks may comprise performing graphics processing tasks, general processing tasks, and/or non-graphics related processing tasks in an environment of trust provided by the trusted security zone 160 and/or the trusted kernel 170.

The portion of the graphics processing unit 130 that is repurposed may be about 10%, about 20%, about 30%, about 40%, about 50%, about 60%, about 70%, about 80%, about 90%, or about 100% of the graphics processing unit 130. The percentage of the graphics processing unit 130 that is repurposed may be a percentage of the graphics processing unit 130 as a whole or a percentage of the processing resources of the graphics processing unit 130. Alternatively, the portion of the graphics processing unit 130 that is repurposed may be the portion of the graphics processing unit 130 that is not processing graphics at the time of the repurposing. The trusted kernel 170 may be configured to monitor the activity level of the graphics processing unit 130 and determine when the graphics processing unit 130 is performing a low level of graphics processing.

The portion of the graphics processing unit 130 that is repurposed may be repurposed in response to low graphics processing levels. The graphics processing unit 130 may have processing resources that are not in use during times of low processing activity. Low graphics processing levels may be graphics processing levels wherein about 10%, about 20%, about 30%, about 40%, about 50%, about 60%, about 70%, about 80%, about 90%, or about 100% of the graphics processing unit 130 is not processing graphics. In an embodiment, the percentage of the graphics processing unit 130 that is not processing graphics may be the percentage of the graphics processing unit's 130 processing resources that are not processing graphics or the percentage of the graphics processing unit 130 as a whole that is not processing graphics.

In an embodiment, the trusted kernel 170 may be configured to return the graphics processing unit 130 to a graphics processing state from a state to which it had been repurposed. The graphics processing unit 130 may be repurposed to the general processing state, the trusted processing state, or to some other processing state in order to take advantage of processing resources that are not in use as described hereinabove. The trusted kernel 170 may return the graphics processing unit 130 to the graphics processing state in response to a demand for a predetermined level of graphics processing.

The predetermined level of graphics processing at which the trusted kernel 170 may return the graphics processing unit 130 to the graphics processing state may be a level at which the graphics processing unit 130 would use about 100%, about 90%, about 80%, about 70%, about 60%, about 50%, about 40%, about 30%, about 20%, about 10%, or about 1% of its processing resources. Alternatively, the trusted kernel 170 may return the graphics processing unit 130 to the graphics processing state in response to any demand for graphics processing. Converting the graphics processing unit 130 to the general processing state, the trusted processing state, or some other processing state in response to low graphics processing activity and returning the graphics processing unit 130 to the graphics processing state in response to graphics processing demands may allow the electronic device 102 to improve processing capacity while maintaining graphics processing capability.

In an embodiment, the trusted kernel 170 may be inserted into the graphics processing unit 130 by and/or from the trusted security zone 160. The CPU 110 may direct the insertion of the trusted kernel 170 into the graphics processing unit 130 in response to detecting a low level of graphics processing activity, in response to detecting processing resources that are not in use, in response to insertion instructions, in response to an elapsed period of time, in response to a change in the graphics processing unit 130, or in response to some other trigger. Once inserted into the graphics processing unit 130, the trusted kernel 170 may repurpose a portion of the graphics processing unit 130 as described hereinabove. In some cases, trust may be considered to have been established on the graphics processing unit 130 after insertion of the trusted kernel 170 into the graphics processing unit 130. The trusted kernel 170 may execute trusted instructions and may prevent the graphics processing unit 130 from executing applications from the permissive sector 150 without first receiving trusted instructions to do so. The repurposed portion of the graphics processing unit 130 may use processing resources that are not in use processing graphics to perform trusted processing tasks. In some cases, the trusted kernel 170 may prevent the graphics processing unit 130 from performing any non-trusted tasks. The trusted kernel 170 may further direct a confidence check of the graphics processing unit 130 as described in greater detail below.

The trusted kernel 170 may remain in the graphics processing unit 130 after insertion, the trusted kernel 170 may be removed after some period of time, or the trusted kernel 170 may be removed in response to stimuli. In some cases, the graphics processing unit may comprise one or more separate kernels that are different from the trusted kernel 170. In an embodiment, the one or more separate kernels may function as the base operating system for the graphics processing unit 130 prior to the insertion of the trusted kernel 170. The trusted kernel 170 may replace the separate kernels, the trusted kernel 170 may suspend processes on the separate kernels, the trusted kernel 170 may co-exist with the separate kernels, the trusted kernel 170 may ignore the separate kernels, or the trusted kernel 170 may interact with the separate kernels in some other way while it remains in the graphics processing unit 130. During the time the trusted kernel 170 remains in the graphics processing unit 130, it may be in communication with the trusted security zone 160. The trusted kernel 170 may relay information about the graphics processing unit 130 to the trusted security zone 160. For example, the trusted kernel 170 may relay information about the activity level of the graphics processing unit 130 and/or information about graphics processing demands received by the graphics processing unit 130 to the trusted security zone 160.

Alternatively, instructions from the trusted security zone 160 may be relayed to the trusted kernel 170. For example, at times when the graphics processing unit 130 has processing resources available, instructions from the trusted security zone 160 may call upon the trusted kernel 170 to direct the graphics processing unit 130 to perform non-graphics related processing tasks such as executing applications from the trusted security zone 160 and/or executing applications from the permissive sector 150.

The trusted kernel 170 may be removed from the graphics processing unit 130 after one hour, six hours, one day, two days, one week, one month, one year, three years, after a predetermined number of changes have been made to the graphics processing unit 130, or after some other period of time. Alternatively, the trusted kernel 170 may be removed in response to a demand for graphics processing. In an embodiment, the trusted kernel 170 may be inserted and removed in response to low graphics processing activity and demand for a predetermined level of graphics processing respectively. In an embodiment, the trusted security zone 160 may comprise a plurality of trusted kernels 170 each comprising different operating systems. The trusted kernels 170 may be selectively inserted into and removed from the graphics processing unit 130 according to the non-graphics related processing tasks the graphics processing unit 130 is to be assigned.

In an embodiment, the trusted security zone 160 may invoke the graphics processing unit 130 to perform trusted processing in parallel with the CPU 110. For example, a user may make an automated teller machine (ATM) transaction. During this transaction, it may be beneficial to the user to maintain an environment of trust in order to prevent nefarious programs from obtaining the user's personal information. The graphics processing unit 130 may have processing resources available to be repurposed for trusted processing suitable for the processing demands of the trusted security zone 160. During the transaction, the CPU 110 may be placed in control of trusted processing associated with the user's personal identification number (PIN) while the repurposed portion of the graphics processing unit 130 may be placed in control of trusted processing associated with a modem used in the transaction.

In an embodiment, the graphics processing unit 130 may comprise the trusted security zone 160 and may insert the trusted kernel 170 into the CPU 110. In this case, the trusted security zone 160 in the graphics processing unit 130 may receive information from the trusted kernel 170 and relay instructions to the trusted kernel 170 as described hereinabove. While the graphics processing unit 130 is highly optimized for processing graphics and may be repurposed for general processing, trusted processing, non-graphics related processing, and other processing, the inherently different structure of the CPU 110 may allow it to perform a wide range of processing tasks without being repurposed. In an embodiment, the processing resources of the CPU 110 may be used to execute instructions from the trusted security zone 160 of the graphics processing unit 130.

In an embodiment, the electronic device 102 may perform a confidence check on the graphics processing unit 130. It should be understood that while performing the confidence check will be described with reference to the graphics processing unit 130, the confidence check may be performed in a substantially similar manner to evaluate the integrity of other processors of the electronic device 102. The confidence check may be performed in response to powering on the electronic device 102, inserting the trusted kernel 170, executing, by the graphics processing unit 130, one of the plurality of non-trusted applications 112, detecting unused processing resources in the graphics processing unit 130, or in response to something else. In an embodiment, the confidence check may be performed prior to repurposing the portion of the graphics processing unit 130 as described hereinabove. Performing the confidence check prior to repurposing the portion of the graphics processing unit 130 may allow the portion of the graphics processing unit 130 to be repurposed in a non-trusted state with confidence that the graphics processing unit 130 has not been compromised. The electronic device 102 may be configured to perform the confidence check on one or more kernels of the graphics processing unit 130. For example, the confidence check may be performed on the one or more separate kernels described hereinabove. The confidence check may be initiated by the CPU 110, the trusted security zone 160, the trusted kernel 170, or by something else.

The confidence check may comprise performing an error detection action such as a checksum, a bit count of the kernels, a cyclic redundancy check, a repetition code check, a horizontal redundancy check, a vertical redundancy check, checking information about a parity bit, checking a digital signature, performing a cryptographic hash function, or performing another type of check configured to evaluate the integrity of the kernels of the graphics processing unit 130. In an embodiment, a trusted application 114 of the trusted applications 114 may be configured to amass information about an uncompromised state of kernels on the graphics processing unit 130 and store the information as trusted information 126 in the trusted security zone 160b for use when the electronic device 102 performs the confidence check.

The uncompromised state of the kernels may be a state that is free from sniffers, malware, trojans, spyware, viruses, and other nefarious programs. The kernels may be provided in the uncompromised state at the time of manufacture and may have information about their uncompromised state stored as trusted information 126 in the trusted security zone 160b of the memory 106 at that time. Information about the uncompromised state of the kernels may comprise information to be used in the confidence check. For example, the information may be information about an error detection action such as a checksum, a bit count of the kernels, information about a cyclic redundancy check, information about a repetition code, information about a horizontal redundancy check, information about a vertical redundancy check, information about a parity bit, a digital signature, or information about a cryptographic hash function. In the case of a checksum, the trusted application 114 may obtain a checksum value for the uncompromised state of each of the kernels of the graphics processing unit 130 and store the values in the trusted security zone 160b.

In an embodiment, the electronic device 102 may activate the trusted application 114 to perform the confidence check in response to powering on the electronic device 102, inserting the trusted kernel 170, executing, by the graphics processing unit 130, one of the plurality of non-trusted applications 112, detecting unused processing resources in the graphics processing unit 130, or in response to something else. The confidence check may comprise comparing the information about the uncompromised state kernels of the graphics processing unit 130 with a current state of the kernels. The current state may be the state of the kernels at the time of the confidence check. The comparison may comprise comparing a checksum value obtained for the uncompromised state of the kernels with a checksum value obtained for the current state of the kernels. Alternatively, the comparison may comprise comparing results of an error detection action performed on the uncompromised state and the current state of the kernels as described hereinabove with reference to the confidence check or it may comprise comparing results from another error detection action performed by the electronic device 102.

In an embodiment, the electronic device 102 may be configured to respond to a result of the comparison between the current state and the uncompromised state of the kernels of the graphics processing unit 130. The response may be to allow the graphics processing unit 130 to function normally in response to the result when the result indicates that the current state of the kernels corresponds to the uncompromised state of the kernels. The uncompromised state and the current state of the kernels may be said to correspond if the comparison indicates that the current state of the kernels is unaltered from the uncompromised state of the kernels. In this case, the electronic device 102 may have confidence that the trusted security zone 160 will not be compromised by allowing the graphics processing unit 130 to function normally when the result indicates that the two states of the kernels correspond.

Alternatively, the electronic device 102 may respond by disallowing the graphics processing unit 130 to function or by attempting to return the graphics processing unit 130 to the uncompromised state in response to the result when the result indicates that the current state of the kernels does not correspond to the uncompromised state of the kernels. When the result indicated that the current state of the kernels does not correspond to the uncompromised state of the kernels, the electronic device 102 may prevent the graphics processing unit 130 from functioning and may call on the CPU 110 to perform simple graphics processing and/or to run error screens indicating a loss of functionality. For example, when the electronic device 102 encounters graphics processing demands that are beyond the capabilities of the CPU 110, the CPU 110 may instruct a display of the electronic device 102 to display an error screen indicating that the graphics processing demand cannot be met. The electronic device 102 may enact this response in order to inhibit nefarious programs from operating on the electronic device 102 and/or corrupting the trusted security zone 160.

Figure 2:
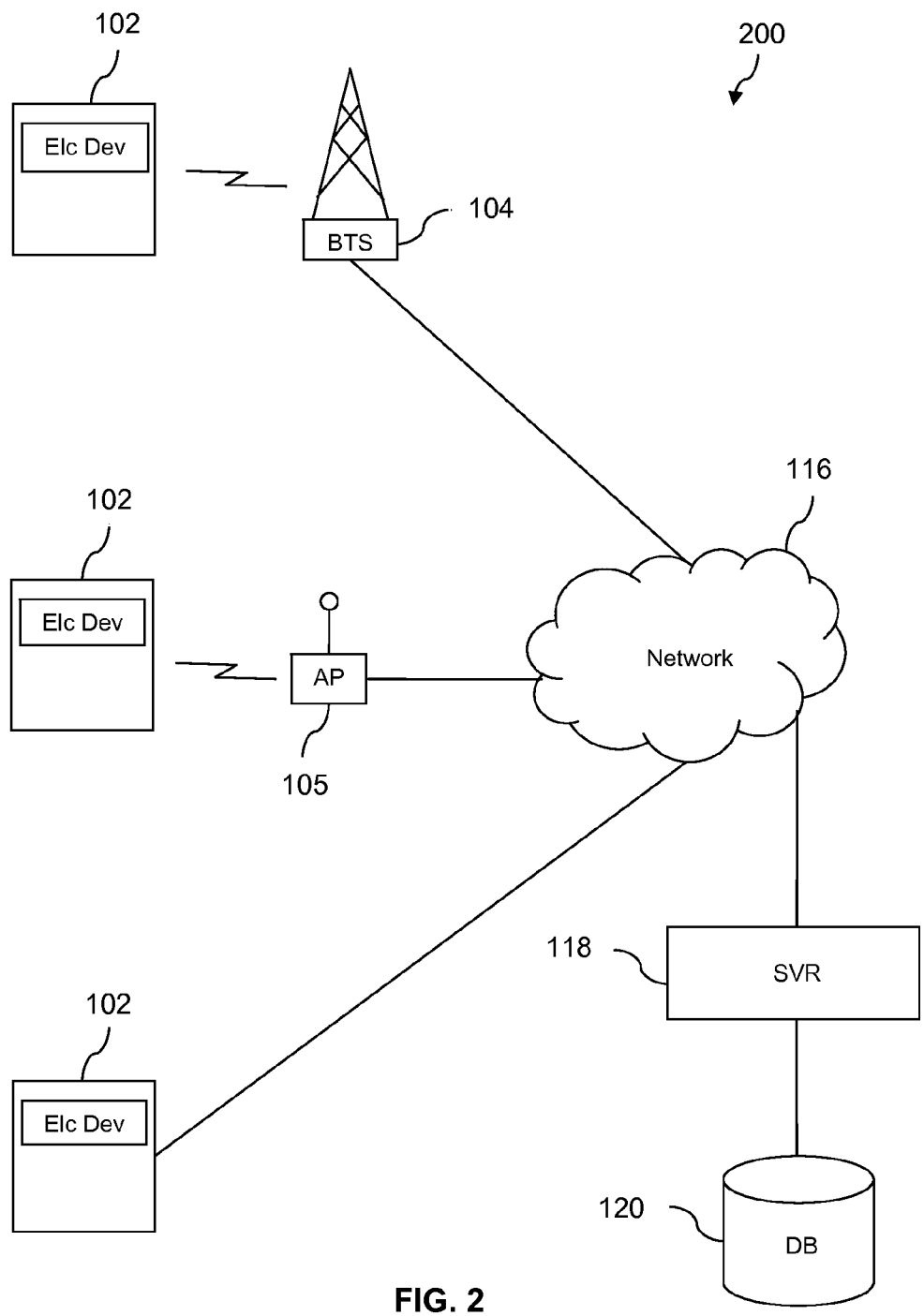
FIG. 2 is an illustration of a communication system according to an embodiment of the disclosure.

Turning now to FIG. 2, a communication system 200 is described. In an embodiment, the communication system 200 comprises the electronic device 102, a base transceiver station (BTS) 104, a wireless access point (AP) 105, a network 116, a trusted server (SVR) 118, and a data store (DB) 120. The electronic device 102 may access the network 116 through wireless communication with the base transceiver station 104 provided by the radio frequency transceiver 108 and/or through the wireless access point 105. Additionally, it is contemplated that the electronic device 102 may be hardwired to the network 116. The network 116 may be connected to the trusted server 118 which may be connected to the data store 120. The electronic device 102 may access information on the network 116 through end-to-end trusted communication infrastructure as described hereinabove.

Though the communication system 200 is depicted as comprising singular components, i.e. one base transceiver station 104 and one network 116, it should be understood that the communication system 200 may comprise a plurality of each component. The communication system 200 may comprise a plurality of base transceiver stations 104, a plurality of networks 116, a plurality of servers 118, a plurality of data stores 120, a plurality of wireless access points 105, and/or a plurality of electronic devices 102 that may be connected to the network 116. For example, the communication system 200 may comprise a plurality of electronic devices 102 that are hardwired to the network 116 and that may access a plurality of servers 118. Alternatively, the communication system 200 may comprise a plurality of electronic devices 102 wirelessly connected to the network 116 through a plurality of base transceiver stations 104. As shown in FIG. 2, there may be a plurality of electronic devices 102 connected to the network 116 each in a different way.

In an embodiment, the electronic device 102 may stream video from the server 118 over the network 116 for presentation on a display. While the streaming video is being played and presented on the display, the graphics processing unit 130 may be active compiling images and may not have unused processing resources. If the video is paused, the graphics processing unit 130 may use less processing resources to present a constant image associated with the paused video. Thus, the graphics processing unit 130 may have unused processing resources available while the video is paused. The electronic device 102 may make use of the unused processing resources as described with reference to FIG. 1.

In an embodiment, the electronic device 102 may allow a user of the electronic device 102 to participate in a video conference. The video conference may be established by connecting the electronic device 102 with another electronic device, potentially another electronic device 102, over the network 116. During the video conference, the graphics processing unit 130 may receive demands for a rapid wash of images to be compiled for presentation on the display. As discussed, the graphics processing unit 130 may not have unused processing resources during times of intense graphics processing. Processing resources may become available if an onscreen participant of the video conference leaves the screen. The screen may display an unchanging image after the onscreen participant leaves the screen and may not display a dynamic image again until the onscreen participant returns to the screen. For example, the video conference may be between two people each alone in a room with stationary surroundings. When a person steps off screen, the image displayed on the screen will become stationary which may free up processing resources of the graphics processing unit 130. The electronic device 102 may make use of the unused processing resources as described with reference to FIG. 1.

In an embodiment, the electronic device 102 may access webpages on the internet and display their contents to a user. The graphics processing unit 130 may be actively processing graphics when the user is changing from webpage to webpage but may experience lower graphics processing levels when the user remains on the same webpage for an extended period of time. Low levels of graphics processing may be indicative of unused processing resources available on the graphics processing unit 130. The electronic device 102 may make use of the unused processing resources as described with reference to FIG. 1. In an embodiment, the electronic device 102 may make use of the unused processing resources only after low graphics processing has continued for a predefined time period. The predefined time period may be immediately, about one second, about five seconds, about ten seconds, about thirty seconds, about one minute, about five minutes, about ten minutes, about thirty minutes, about an hour, or some other time period.

Figure 3:
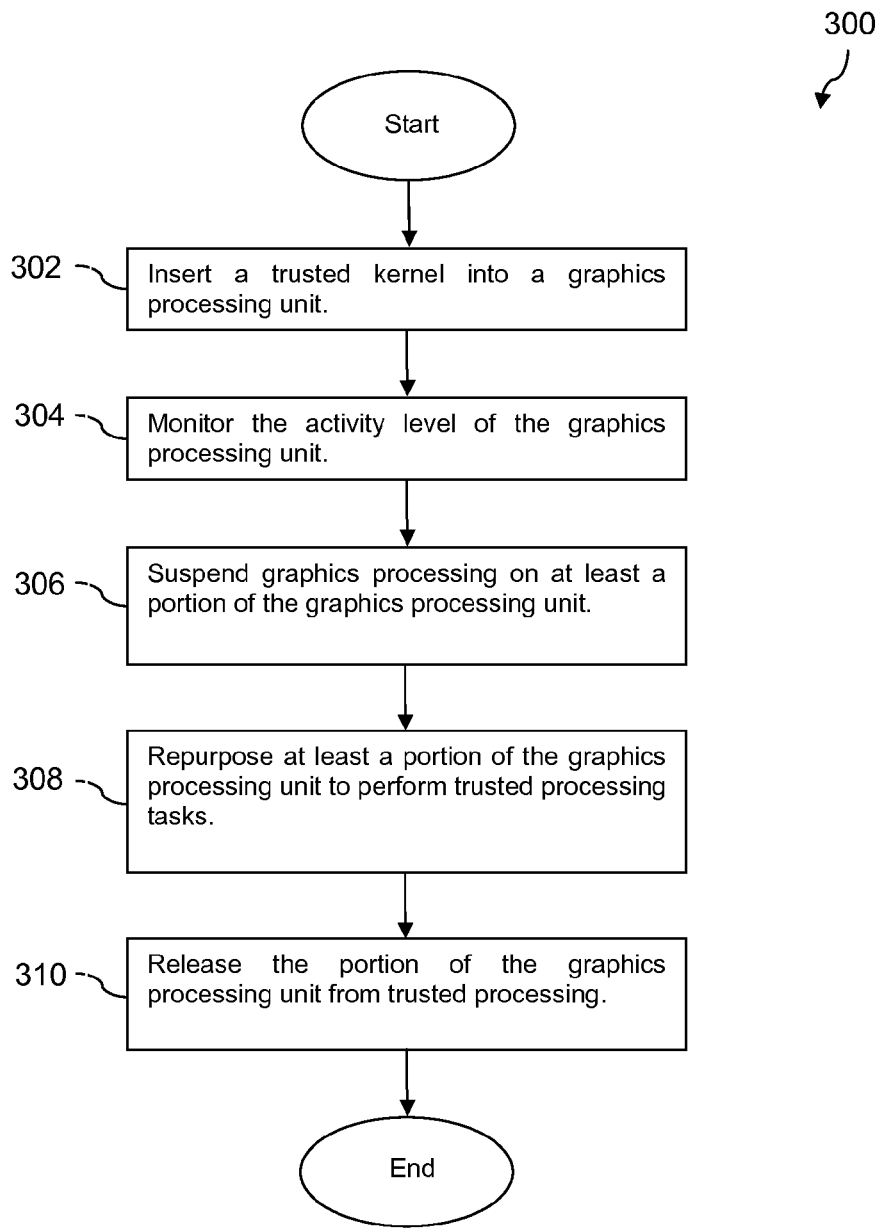
FIG. 3 is a flow chart of a method according to an embodiment of the disclosure.

Turning now to FIG. 3, a method 300 is described. The method 300 may be implemented in the electronic device 102 described hereinabove with reference to FIG. 1 and FIG. 2 and may make use of the trusted kernel 170, the graphics processing unit 130, the trusted security zone 160, the permissive sector 150, the CPU 110, the trusted information 126, the plurality of trusted applications 114, the memory 106, and/or other components of the electronic device 102. At block 302, a trusted kernel may be inserted into a graphics processing unit. In an embodiment, the graphics processing unit may be a non-trusted graphics processing unit. The trusted kernel may be inserted at the time of manufacture or at some other time. For example, the trusted kernel may be inserted by a trusted security zone as described hereinabove. The activity level of the graphics processing unit may be monitored at block 304. The activity level may be monitored by the trusted security zone, the trusted kernel, an application, a CPU, or by something else.

In an embodiment, the graphics processing unit may be prevented from running non-trusted applications absent trusted instructions. In an embodiment, the graphics processing unit may be prevented from running non-trusted applications by the trusted kernel. The graphics processing unit may be allowed to run non-trusted application in response to trusted instructions from the trusted kernel, from the trusted security zone, or from another trusted source. The trusted security zone may be in communication with the trusted kernel and may provide instructions for the graphics processing unit through the trusted kernel. In some cases, instructions from the trusted kernel may be considered trusted instructions and/or instructions from the trusted security zone.

At block 306, graphics processing may be suspended on a portion of the graphics processing unit. The portion of the graphics processing unit on which graphics processing has been suspended may be about 5%, about 10%, about 20%, about 30%, about 40%, about 50%, about 60%, about 70%, about 80%, about 90%, or about 100% of the graphics processing unit. A portion of the graphics processing unit may be repurposed at block 308. In an embodiment, the portion of the graphics processing unit that is repurposed may be the portion of the graphics processing unit on which graphics processing has been suspended.

The portion of the graphics processing unit may be repurposed to perform non-graphics related processing tasks in response to low graphics processing activity. In some cases, the portion of the graphics processing unit may be repurposed to perform trusted processing tasks in response to low graphics processing activity. Trusted processing tasks may comprise non-graphics related processing tasks and/or general processing tasks as described hereinabove with reference to FIG. 1. The portion of the graphics processing unit that is repurposed may be about 10%, about 20%, about 30%, about 40%, about 50%, about 60%, about 70%, about 80%, about 90%, or about 100% of the graphics processing unit. In an embodiment, the percentage of the graphics processing unit that is repurposed may be a percentage of the processing resources of the graphics processing unit or a percentage of the graphics processing unit as a whole. Alternatively, the portion of the graphics processing unit that is repurposed may be the portion of the graphics processing unit that is not processing graphics at the time of the repurposing.

The trusted kernel may be configured to monitor the activity level of the graphics processing unit and determine when the graphics processing unit is performing a low level of graphics processing. Low graphics processing levels may be graphics processing levels wherein about 10%, about 20%, about 30%, about 40%, about 50%, about 60%, about 70%, about 80%, about 90%, or about 100% of the graphics processing unit is not processing graphics. The percentage of the graphics processing unit that is not processing graphics may be the percentage of the graphics processing unit's processing resources that are not processing graphics or the percentage of the graphics processing unit as whole that is not processing graphics.

The portion of the graphics processing unit may be released from trusted processing at block 310. In an embodiment, the portion of the graphics processing unit may be released in response to receiving a demand for graphics processing. The graphics processing unit may resume processing graphics upon release. Releasing the portion of the graphics processing unit may allow the graphics processing unit to apply full processing resources to meet the graphics processing demand. In an embodiment, the portion of the graphics processing unit repurposed for trusted processing may be released from trusted processing in response to a demand for graphics processing that calls for about 10%, about 20%, about 30%, about 40%, about 50%, about 60%, about 70%, about 80%, about 90%, or about 100% of the graphics processing unit to process graphics in order to meet the demand. Alternatively, the portion of the graphics processing unit repurposed for trusted processing may be released from trusted processing in response to any demand for graphics processing. As described hereinabove, the percentages of the graphics processing unit called for graphics processing may refer to percentages of processing resources or percentages of the graphics processing unit as a whole.

Figure 4:
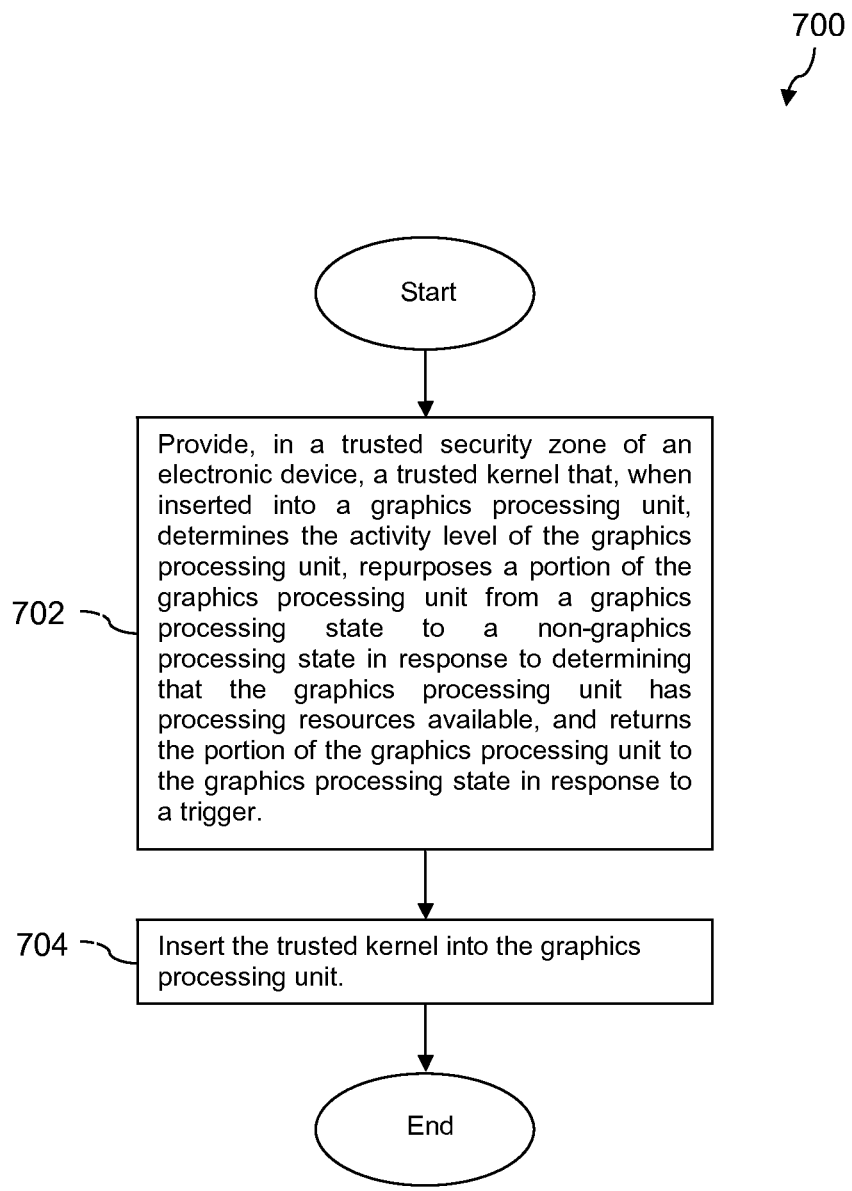
FIG. 4 is a flow chart of a method according to an embodiment of the disclosure.

Turning now to FIG. 4, a method 700 is described. The method 700 may be implemented in the electronic device 102 described hereinabove with reference to FIG. 1 and FIG. 2 and may make use of the trusted kernel 170, the graphics processing unit 130, the trusted security zone 160, the permissive sector 150, the CPU 110, the trusted information 126, the plurality of trusted applications 114, the memory 106, and/or other components of the electronic device 102.

At block 702, a trusted kernel may be provided in a trusted security zone of an electronic device. The trusted kernel may, when inserted into a graphics processing unit, determine the activity level of the graphics processing unit and repurpose a portion of the graphics processing unit from a graphics processing state to a non-graphics related processing state. The portion of the graphics processing unit may be repurposed to the non-graphics related processing state in response to determining that the graphics processing unit has processing resources available. The non-graphics related processing state may be a trusted processing state and/or a general processing state as described hereinabove. The trusted kernel may further return the portion of the graphics processing unit to the graphics processing state in response to a trigger. In an embodiment, the trigger may be a demand for graphics processing as described above with reference to FIG. 3, instructions from the trusted security zone, an elapsed period of time, a change in the graphics processing unit, or instructions from another source.

The trusted kernel may be inserted into the graphics processing unit at block 704. In an embodiment, the trusted kernel may be inserted into the graphics processing unit at the time of manufacture. Alternatively, the trusted kernel may be inserted into the graphics processing unit at some time after manufacture. The trusted kernel may be inserted into the graphics processing unit by the trusted security zone and/or from the trusted security zone as described hereinabove with reference to FIG. 1. Inserting the trusted kernel configured to repurpose the graphics processing unit for non-graphics related processing may allow the electronic device to allocate some of a CPU's processing tasks to the graphics processing unit when the graphics processing unit has processing resources available which may free up CPU processing resources and may improve the speed and efficiency of the electronic device. Alternatively, inserting the trusted kernel into the graphics processing unit may establish the trusted security zone on the graphics processing unit, and the graphics processing unit may allocate processing tasks to the CPU. In an embodiment, the CPU and the graphics processing unit may be configured to run in a time-sliced fashion as discussed hereinabove with reference to virtual processors.

Figure 5:
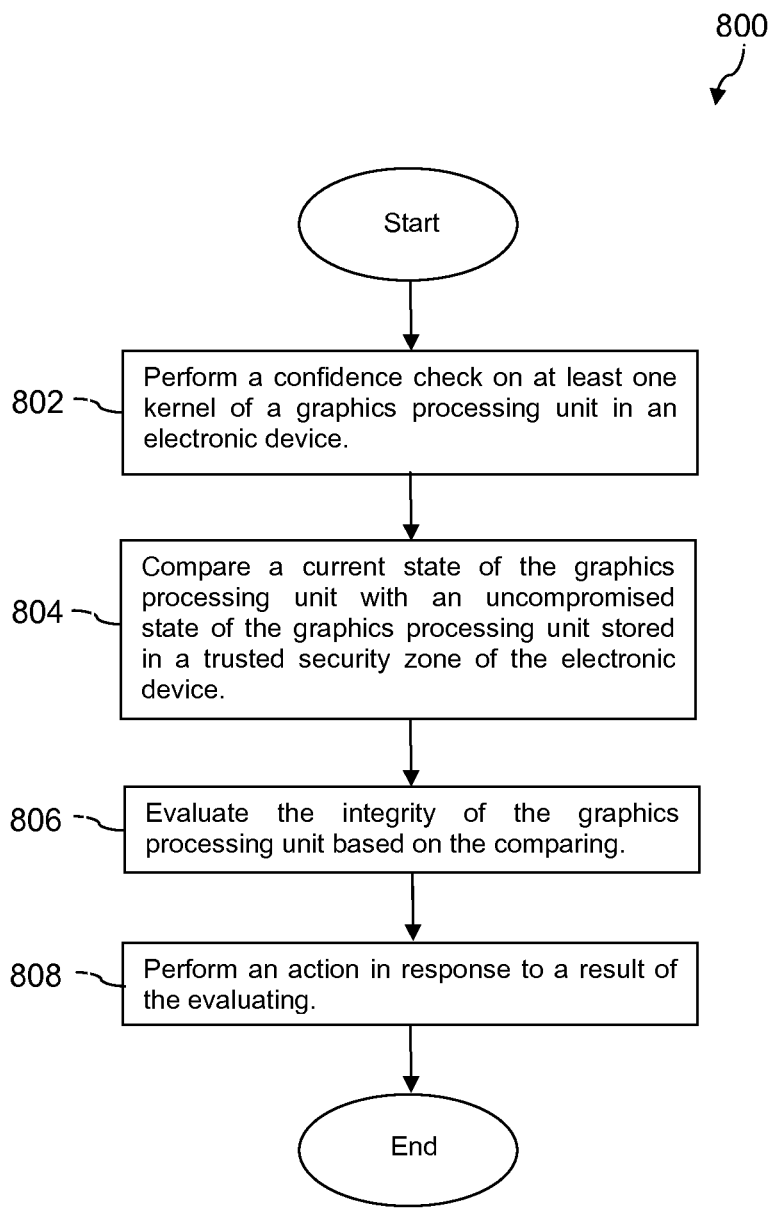
FIG. 5 is a flow chart of a method according to an embodiment of the disclosure.

Turning now to FIG. 5, a method 800 is described. The method 800 may be implemented in the electronic device 102 described hereinabove with reference to FIG. 1 and FIG. 2 and may make use of the trusted kernel 170, the graphics processing unit 130, the trusted security zone 160, the permissive sector 150, the CPU 110, the trusted information 126, the plurality of trusted applications 114, the memory 106, and/or other components of the electronic device 102. A confidence check may be performed on at least one kernel of a graphics processing unit in an electronic device at block 802. For example, the confidence check may be performed on the one or more separate kernels described hereinabove with reference to FIG. 1. In an embodiment, the confidence check may be performed as described hereinabove with reference to the graphics processing unit 130 described in the discussion of FIG. 1. The confidence check may be performed on a graphics processing unit of the electronic device, on a CPU of the electronic device, or on some other processing component of the electronic device.

At block 804, a current state of the graphics processing unit may be compared with an uncompromised state of the graphics processing unit stored in a trusted security zone of the electronic device. In an embodiment, the current state and the uncompromised state of kernels of the graphics processing unit may be considered to be representative of the current state and the uncompromised state of the graphics processing unit as a whole. The current state of the graphics processing unit may be the state of the graphics processing unit at the time of the confidence check. The uncompromised state of the graphics processing unit may be a state free of sniffers, malware, trojans, spyware, viruses, and other nefarious programs.

The integrity of the graphics processing unit and/or one or more kernels operating on the graphics processing unit may be evaluated at block 806 based on the comparing the current state of the graphics processing unit with the uncompromised state of the graphics processing unit. In some cases, evaluating the integrity of the graphics processing unit may comprise evaluating the integrity of one or more kernels operating on the graphics processing unit. In an embodiment, the integrity of the graphics processing unit may be evaluated based upon analyzing a result of the comparison. The result may be analyzed by a CPU of the electronic device, a trusted application of the electronic device, the trusted security zone of the electronic device, or by something else. The integrity of the graphics processing unit may be confirmed if the analysis of the result indicates that the current state of the graphics processing unit corresponds with the uncompromised state of the graphics processing unit. The integrity of the graphics processing unit may fail to be confirmed if the analysis of the result indicates that the current state of the graphics processing unit does not correspond with the uncompromised state of the graphics processing unit.

At block 808, an action may be performed in response to a result of the evaluating. In an embodiment, the electronic device may be configured to allow the graphics processing unit to function normally in response to the result when the result indicates that the current state of the graphics processing unit corresponds to the uncompromised state of the graphics processing unit. The uncompromised state and the current state of the graphics processing unit may be said to correspond if the comparison indicates that the current state of the graphics processing unit is unaltered from the uncompromised state of the graphics processing unit. In this case, the electronic device may have confidence that the trusted security zone will not be compromised by allowing the graphics processing unit to function normally when the result indicates that the two states of the graphics processing unit correspond. In some cases, the action may comprise repurposing a portion of the graphics processing unit as described hereinabove with reference to the graphics processing unit 130.

Alternatively, the electronic device may disallow the graphics processing unit to function or attempt to return the graphics processing unit to the uncompromised state in response to the result when the result indicates that the current state of the graphics processing unit does not correspond to the uncompromised state of the graphics processing unit. The electronic device may enact this response in order to inhibit nefarious programs from corrupting the trusted security zone.

Performing the confidence check on the graphics processing unit may allow the electronic device to detect nefarious programs that it may have been otherwise unable to detect which may provide greater security to the electronic device. Detecting nefarious programs that may have otherwise gone undetected may further fortify the trusted security zone.

Figure 6:
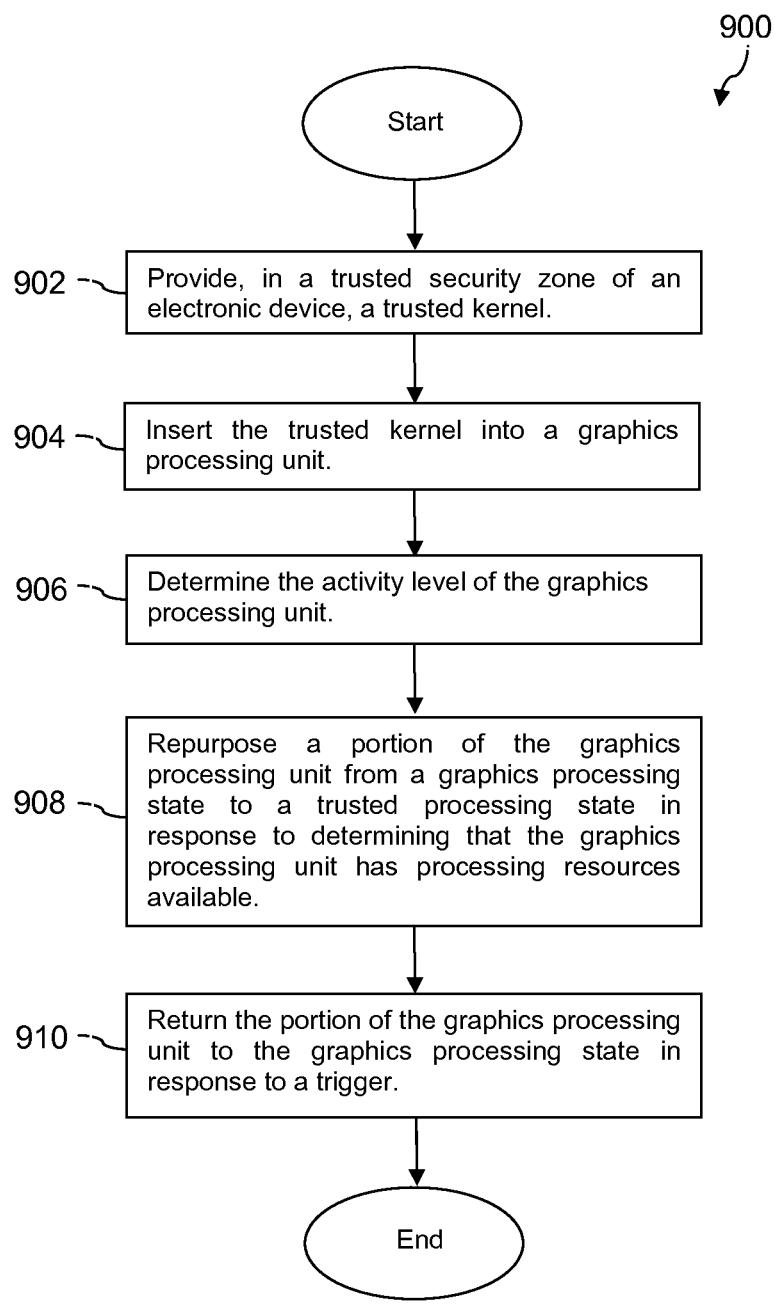
FIG. 6 is a flow chart of a method according to an embodiment of the disclosure.

Turning now to FIG. 6, a method 900 is described. The method 900 may be implemented in the electronic device 102 described hereinabove with reference to FIG. 1 and FIG. 2. At block 902, a trusted kernel may be provided in a trusted security zone of an electronic device. The trusted kernel may be inserted into a graphics processing unit at block 904. In an embodiment, the trusted kernel may be inserted in response to instructions from the trusted security zone. The activity level of the graphics processing unit may be determined at block 906. At block 908, a portion of the graphics processing unit may be repurposed from a graphics processing state to a trusted processing state in response to determining that the graphics processing unit has processing resources available. In some cases, the graphics processing state may be a state in which the graphics processing unit is functioning in the permissive sector. In an embodiment, the portion of the graphics processing unit that is repurposed may be about 5%, about 10%, about 20%, about 30%, about 40%, about 50%, about 60%, about 70%, about 80%, about 90%, or about 100%. The trusted processing state may be a non-graphics processing state.

The non-graphics related processing state may be a general processing state, a type of trusted processing state, or some other processing state. The portion of the graphics processing unit may be returned to the graphics processing state at block 910 in response to a trigger. In an embodiment, the trigger may be an indication of a demand for graphics processing. Alternatively, the trigger may be the demand for graphics processing. In an embodiment, the method may further comprise establishing communication between the trusted kernel and the trusted security zone of the electronic device. For example, a communication link may be established between the trusted kernel and the trusted security zone partition on a CPU of the electronic device.

Figure 7:
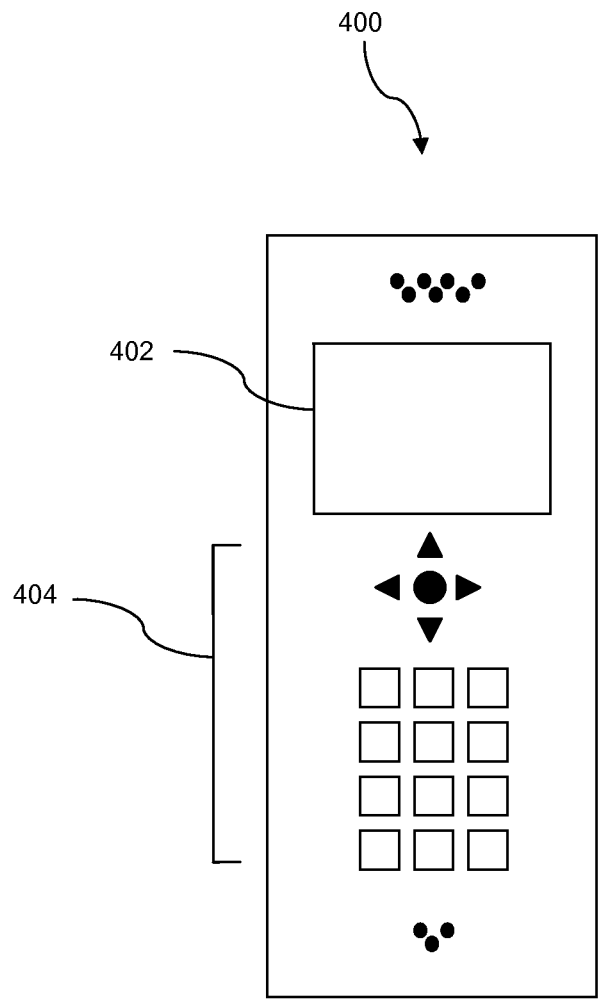
FIG. 7 is an illustration of a mobile communication device according to an embodiment of the disclosure.

FIG. 7 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 8:
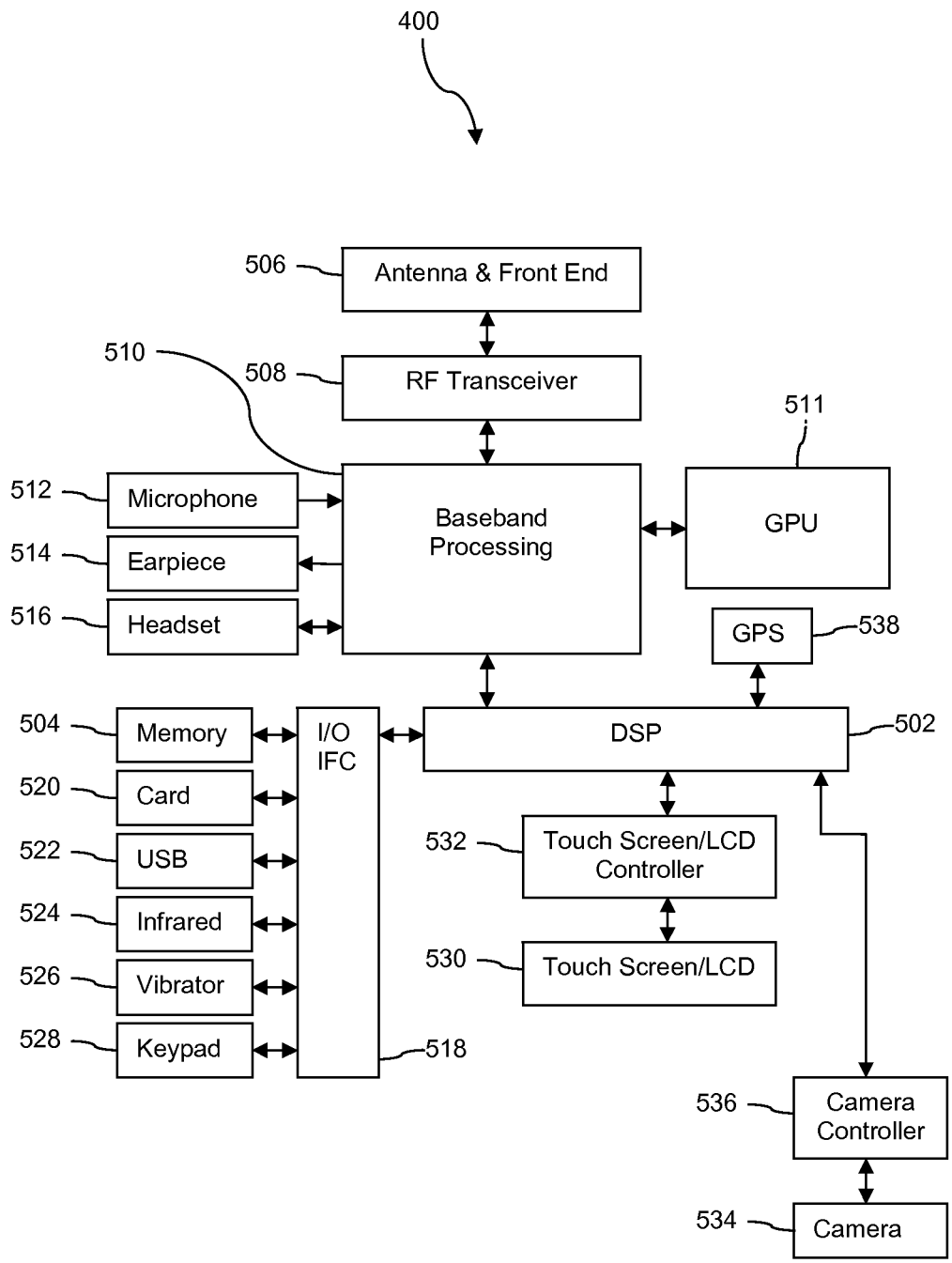
FIG. 8 is a block diagram of a mobile communication device according to an embodiment of the disclosure.

FIG. 8 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a graphics processing unit (GPU) 511, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 9A:
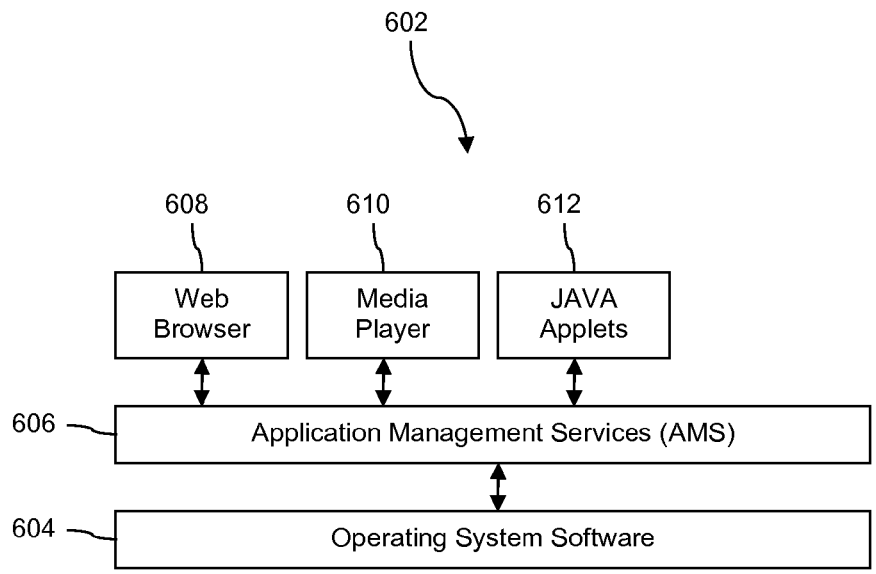
FIG. 9A is a block diagram of a software architecture of a mobile communication device according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 9A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 9B:
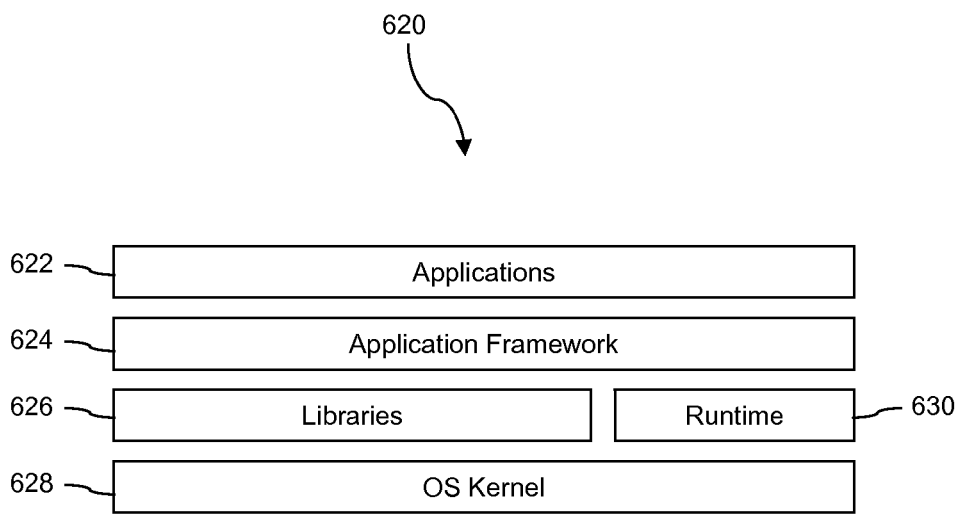
FIG. 9B is a block diagram of another software architecture according to an embodiment of the disclosure.

FIG. 9B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
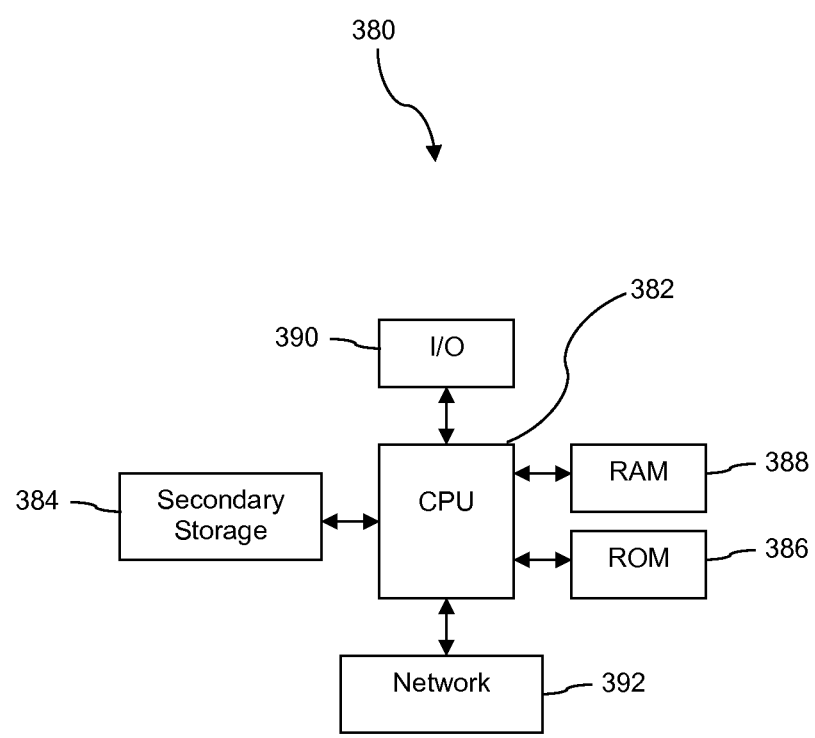
FIG. 10 illustrates an exemplary computer system suitable for implementing the several embodiments of the disclosure.

FIG. 10 illustrates a computer system 380 suitable for implementing one or more embodiments disclosed herein. The computer system 380 includes a central processing unit (CPU) 382 that is in communication with memory devices including secondary storage 384, read only memory (ROM) 386, random access memory (RAM) 388, input/output (I/O) devices 390, and network connectivity devices 392. The CPU 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the CPU 382 to communicate with the Internet or one or more intranets. With such a network connection, it is contemplated that the CPU 382 might receive information from the network, or might output information to the network in the course of performing the above-described method steps. Such information, which is often represented as a sequence of instructions to be executed using CPU 382, may be received from and outputted to the network, for example, in the form of a computer data signal embodied in a carrier wave.

Such information, which may include data or instructions to be executed using CPU 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The CPU 382 executes instructions, codes, computer programs, scripts which it accesses from hard disk, floppy disk, optical disk (these various disk based systems may all be considered secondary storage 384), ROM 386, RAM 388, or the network connectivity devices 392. While only one CPU 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The CPU 382 may process the executable instructions and/or data structures in part by directly accessing the computer program product, for example by reading from a CD-ROM disk inserted into a disk drive peripheral of the computer system 380. Alternatively, the CPU 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the CPU 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of extending trust from a trusted processor to a graphics processing unit to expand trusted processing in an electronic device, comprising:
    inserting, from a trusted security zone of the electronic device, a trusted kernel into the graphics processing unit of the electronic device, wherein the trusted security zone comprises a secure subsystem that is not accessible to hardware and software components outside the secure subsystem, and wherein the graphics processing unit is outside of the secure subsystem;
    monitoring, by the trusted kernel in the graphics processing unit, an activity level of the graphics processing unit;
    suspending, via the trusted kernel in the graphics processing unit, graphics processing on at least a portion of the graphics processing unit based on the monitoring;
    repurposing, via the trusted kernel, at least the portion of the graphics processing unit to perform trusted processing by bringing at least the portion of the graphics processing unit into the secure subsystem; and
    releasing, by the trusted processor of the trusted security zone, at least the portion of the graphics processing unit from trusted processing in the secure subsystem.

2. The method of claim 1, wherein the repurposing comprises: establishing trusted security zone control over the portion of the graphics processing unit; and configuring the portion of the graphics processing unit to perform tasks other than graphics processing.

3. The method of claim 1, wherein at least one of the monitoring, the suspending, the repurposing, or the releasing is done via the trusted kernel.

4. The method of claim 1, wherein the trusted kernel is inserted at the time of manufacture.

5. The method of claim 1, wherein at least one of the suspending or the repurposing is done in response to a graphics processing activity level falling below a threshold.

6. The method of claim 5, wherein the graphics processing activity level falling below the threshold corresponds with at least 10% of the graphics processing unit not processing graphics.

7. A computer-implemented method of increasing a trusted processing capacity of an electronic device, comprising:
    providing, in a trusted security zone of the electronic device on a trusted processor, a trusted kernel, wherein the trusted security zone comprises a secure subsystem;
    inserting, from the trusted security zone of the trusted processor, the trusted kernel into a graphics processing unit of the electronic device;
    determining, by the trusted kernel, that the graphics processing unit has processing resources available based on an activity level of the graphics processing unit;
    repurposing, via the trusted kernel, a portion of the graphics processing unit from a graphics processing state to a trusted processing state in response to determining that the graphics processing unit has processing resources available, wherein the graphics processing state is outside of the secure subsystem and the trusted processing state is within the secure subsystem; and
    returning, by the trusted kernel, the portion of the graphics processing unit to the graphics processing state in response to a trigger.

8. The method of claim 7, wherein the graphics processing state is a state in which the graphics processing unit is functioning in a permissive sector on the electronic device, and wherein the permissive sector is outside of the secure subsystem.

9. The method of claim 7, wherein the trusted kernel is inserted into the graphics processing unit in response to instructions from the trusted security zone of the electronic device.

10. The method of claim 7, wherein the trigger is an indication of a demand for graphics processing outside of the secure subsystem of the trusted security zone.

11. The method of claim 7, wherein the portion of the graphics processing unit that is repurposed is at least about 10% of the graphics processing unit.

12. The method of claim 7, further comprising:
    establishing communication between the trusted kernel inserted in the graphics processing unit and the trusted security zone of the electronic device.

13. A computer-implemented method of evaluating a graphics processing unit in an electronic device, comprising:
    performing, by a trusted security zone of the electronic device, a confidence check on at least one kernel of the graphics processing unit of the electronic device, wherein the graphics processing unit is outside of a secure subsystem of the trusted security zone;
    comparing a current state of the graphics processing unit with an uncompromised state of the graphics processing unit stored in the trusted security zone of the electronic device;
    evaluating the integrity of the graphics processing unit based on the comparing;
    inserting, from the trusted security zone of the electronic device, a trusted kernel into the graphics processing unit of the electronic device responsive to the evaluating;
    suspending, via the trusted kernel inserted in the graphics processing unit, graphics processing on at least a portion of the graphics processing unit; and
    repurposing at least the portion of the graphics processing unit to perform non-graphics processing related tasks within the secure subsystem via the graphics processing unit and the trusted kernel in response to the suspending.

14. The method of claim 13, wherein performing the confidence check comprises performing an error detection action, and wherein performing an error detection action comprises at least one of: comparing a checksum value of the uncompromised state of the kernel with a checksum value of the current state of the kernel, comparing a bit count of the uncompromised state of the kernel with a bit count of the current state of the kernel, performing a cyclic redundancy check, performing a repetition code check, performing a horizontal redundancy check, performing a vertical redundancy check, checking information about a parity bit, checking a digital signature, or comparing a digest of a cryptographic hash function applied to the uncompromised state of the kernel with a digest of the current state of the kernel.

15. The method of claim 13, wherein evaluating the integrity of the graphics processing unit comprises comparing a result of the confidence check to information about the uncompromised state of the kernel stored in the trusted security zone of the electronic device.

16. The method of claim 15, wherein the uncompromised state of the graphics processing unit is a state in which the kernel is free from sniffers, malware, spyware, trojans, viruses, and nefarious programs.

17. The method of claim 13, wherein the current state of the graphics processing unit is the state of the graphics processing unit at the time of the confidence check.

18. The method of claim 13, further comprising allowing the graphics processing unit to continue to function normally in response to a result from the evaluating indicating that the graphics processing unit is uncompromised.

19. The method of claim 13, further comprising initiating an attempt to return the graphics processing unit to the uncompromised state in response to a result from the evaluating indicating that the graphics processing unit has been compromised.

* * * * *